United States Patent [19]

Voznick

[11] 4,436,438
[45] Mar. 13, 1984

[54] MULTIPLE PROBE TEMPERATURE MEASURING SYSTEM AND PROBES THEREFOR

[75] Inventor: Henry P. Voznick, Arcadia, Calif.

[73] Assignee: Wahl Instruments, Inc., Culver City, Calif.

[21] Appl. No.: 285,531

[22] Filed: Jul. 21, 1981

[51] Int. Cl.³ ............................................. G01K 7/20
[52] U.S. Cl. .................................. 374/165; 374/185; 324/65 P
[58] Field of Search ............... 374/185, 165, 169, 166, 374/1; 324/65 P

[56] References Cited

U.S. PATENT DOCUMENTS

| | | | |
|---|---|---|---|
| 2,716,343 | 8/1955 | Wieszeck | 73/361 |
| 3,114,125 | 12/1963 | Werner et al. | 338/28 |
| 3,187,576 | 6/1965 | Beeston | 374/165 |
| 3,267,733 | 8/1966 | Chambers | 73/362 |
| 3,286,524 | 11/1966 | Malone | 374/166 |
| 3,290,940 | 12/1966 | Hines | 374/185 |
| 3,308,666 | 3/1967 | Anderson et al. | 73/362 |
| 3,431,781 | 3/1969 | Wiggin | 73/362 |
| 3,434,350 | 3/1969 | Kinney | 73/362.4 |
| 3,541,857 | 11/1970 | Massey | 73/362 |
| 3,592,059 | 7/1971 | Chilton | 374/178 |
| 3,776,040 | 12/1973 | Gould | 73/362 AR |
| 3,783,692 | 1/1974 | Hansen | 73/362 AR |
| 3,845,443 | 10/1974 | Fisher | 338/25 |
| 3,861,214 | 1/1975 | Siyahi | 73/362 |
| 3,893,058 | 7/1975 | Keith | 338/28 |
| 3,938,387 | 2/1976 | Flesch | 73/359 |
| 4,020,443 | 4/1977 | LeRoy et al. | 338/28 |
| 4,050,052 | 9/1977 | Reichelt et al. | 338/308 |
| 4,050,309 | 9/1977 | Junkert et al. | 73/362 AR |
| 4,058,787 | 11/1977 | Ichikawa et al. | 338/22 R |
| 4,077,690 | 3/1978 | Koether | 339/89 R |
| 4,085,398 | 4/1978 | Bertram et al. | 338/25 |
| 4,103,275 | 7/1978 | Diehl et al. | 338/25 |
| 4,114,446 | 9/1978 | Walsh | 73/362 |
| 4,129,848 | 12/1978 | Frank et al. | 338/308 |
| 4,146,957 | 4/1979 | Toenshoff | 29/612 |
| 4,186,368 | 1/1980 | White et al. | 338/28 |

OTHER PUBLICATIONS

8-Page Brochure of Applicant Entitled "Wahl Precision Platinum-RTD Digital Heat-Prober Thermometers", pp. 4,5,6 and 7.

*Primary Examiner*—Charles Frankfort
*Assistant Examiner*—Denis E. Corr
*Attorney, Agent, or Firm*—Gausewitz, Carr, Rothenberg & Edwards

[57] ABSTRACT

The platinum resistive sensor of a temperature measuring surface probe has a resistance greater than the resistance to which the associated meter is calibrated. This provides a compensation that is a function of temperature and decreases errors due to heat loss from the probe. An immersion probe having no heat loss can be used interchangeably with the same meter by adding sufficient fixed resistances in the circuits of the two probes to provide equal resistance outputs to the meter from both the probe that experiences no loss and the one that does, with the meter being calibrated to a standard resistance curve.

8 Claims, 7 Drawing Figures

U.S. Patent    Mar. 13, 1984    Sheet 1 of 2    4,436,438
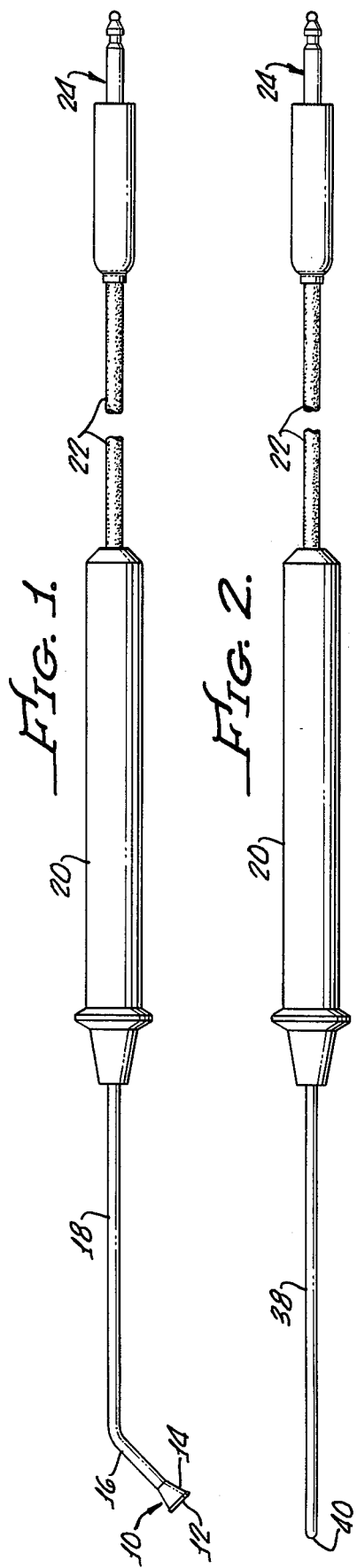
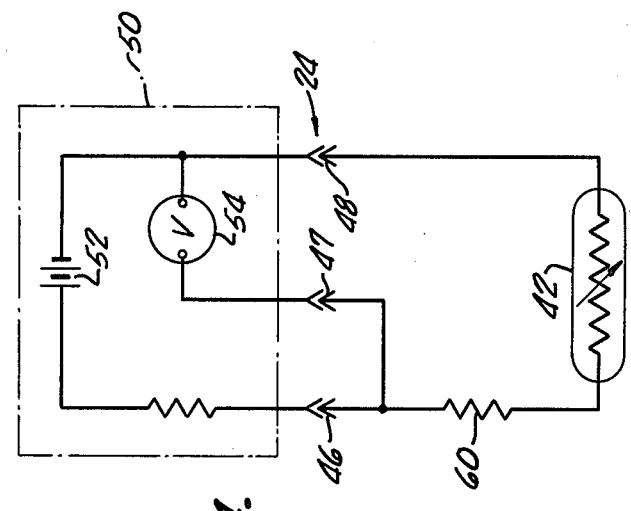
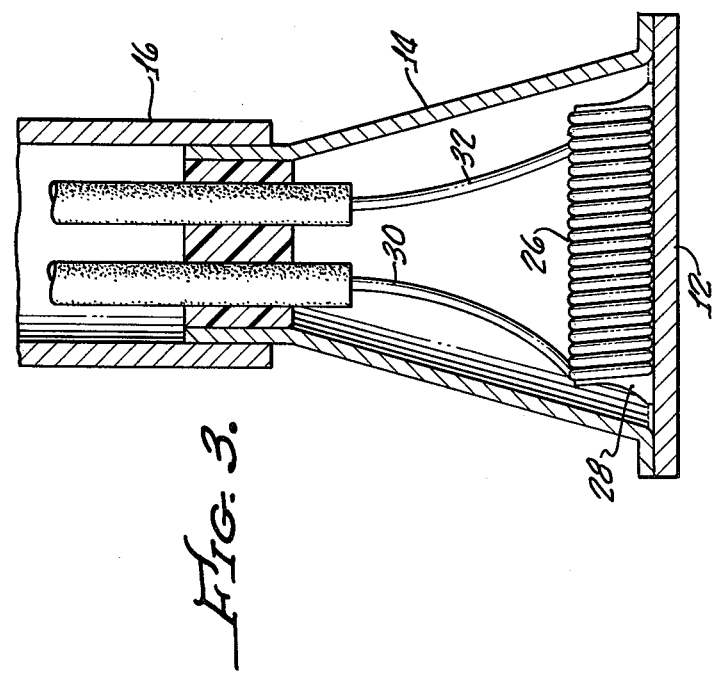

MULTIPLE PROBE TEMPERATURE MEASURING SYSTEM AND PROBES THEREFOR

BACKGROUND OF THE INVENTION

The present invention relates to the measurement of temperature and more particularly concerns temperature measuring methods and apparatus of improved accuracy and greater flexibility.

For precision measurement of temperature, platinum RTD (resistance temperature detector) probes are used in conjunction with a meter to provide a display of measured temperature. The probe generally comprises a probe body of a configuration designed for a particular type of temperature measurement having a platinum resistive sensor mounted therein, the body being connected via a probe shank to a handle or other support to enable positioning of the body in contact with surface of an object of which temperature is to be measured. Resistance of the platinum sensor varies with temperature according to a known relation depending upon the purity of the platinum and accordingly, the platinum sensor resistance may be measured by the meter to provide an indication of measured temperature. Platinum is defined by International Practical Temperature Standards adopted in 1968(IPTS-68) and by German specifications (DIN43760) for nominal values. Platinum is the interpolating temperature standard of the U.S. National Bureau of Standards. Thus, this invention's thrust is to relate all measurements made by probes in any configuration to standards. The meter is calibrated according to the known variation of sensor resistance with temperature variation and will readily provide a readout in degrees based upon the measured resistance.

Different types of resistance probes are generally made for interchangeable use with a single meter. Several different probe, shank and tip configurations may be employed to measure temperature of different surfaces of objects. A different configuration of probe may be employed for measurement of a material that may be penetrated by insertion of the probe. Although there may be as many as twenty different types of probes made for use with a single meter, the probes are generally of two broad configurations, those that may be termed "surface probes" and those termed "immersion probes". In use, an immersion probe has its heat sensitive portion completely immersed within or penetrating the body of medium of which temperature is to be measured. The surface probe, on the other hand, can only have a portion of the external probe body surface in contact with the surface of the object of which temperature is to be measured. Accordingly, in the immersion probe, heat of the object to be measured can be transferred to the platinum sensor within the body of the probe tip without loss to the surrounding medium. With the surface probe, on the other hand, heat must be transferred to the platinum sensor within the probe tip through only that part of the probe body that is in contact with the surface to be measured. Other portions of the probe body will not be in contact with the surface to be measured, but will be in contact with the ambient medium, the surrounding air. Heat absorbed by the surface probe body from the surface to be measured is transferred both to the platinum sensor and to the surrounding air. To the extent that heat is transferred to the surrounding air from the probe body, the latter may be at a lower temperature than the temperature of the surface to be measured. It follows that in the surface probe there exists a temperature differential between the unknown temperature of the surface contacted by the probe body and the temperature of the platinum sensor. This temperature differential exists even long after the termination of the inherent response time of the probe, namely, the time required for the probe to substantially attain its final temperature.

Because the temperature measurement made with a resistive element measures resistance based upon the temperature of the sensor element itself rather than the temperature of the object being measured, and because the temperature of the sensor element in a surface probe is often less than the temperature of the surface being measured (where ambient temperature is below the measured temperature) the surface temperature probe body must be carefully manufactured with a view toward minimizing, to the greatest extent possible, heat lost by the probe body.

Careful, precise and costly manufacture of a surface probe tends to decrease these heat losses and to change concommitant heat measurement errors to acceptable magnitudes, in many applications. But even so, a single meter adapted for alternative use with immersion and surface probes will provide disparate readings for the two probes.

In certain surface probe configurations, such as those employing a coil of platinum wire cemented to a support in the manner generally illustrated in the patent to Werner et al U.S. Pat. No. 3,114,125, it is possible, with great care in manufacture, to hold heat losses of the surface probe to a small amount. However, when employing a probe of a different configuration involving a platinum wire coil of different construction or orientation, or when employing a platinum resistive sensor in the form of a thin film of platinum deposited in a serpentine configuration upon a substrate as in U.S. Pat. Nos. 4,129,848, 4,050,052 and 4,103,275, for example, a surface probe configuration may be subject to unacceptably high losses. These losses may be as much as one to ten percent, making such configurations unacceptable for precision temperature measurement. Speed of response may also be decreased.

Accordingly, it is an object of the present invention to provide precision temperature measurement that eliminates or significantly decreases abovementioned problems. Among other objects is the provision of a useful temperature measuring system in which a wide variety of probe sensors may be used interchangeably with the same meter, without specific recalibration each time a probe is changed. This feature is a matter of serviceability and confidence to the user. It is another object to provide surface sensor probes that accurately measure surface temperature for which they were designed. Over one half of the probes sold are for measurement of surface temperature. Measuring surface temperature requires a different treatment of design factors than immersion sensors.

SUMMARY OF THE INVENTION

In carrying out principles of the present invention in accordance with a preferred embodiment thereof, surface temperature is measured by a heat sensitive probe having a probe body in which is mounted a temperature responsive sensor resistor that will attain a temperature lower than that of a surface that is contacted by the probe body. A given probe configuration is characterized to compensate for loss in a specific probe configuration. Resistance of the sensor is measured and there is indicated a temperature greater than the temperature of the sensor resistor by an amount that varies with temperature. In order to be used with a meter calibrated to read temperatures in terms of a sensor resistance having a nominal resistance at a reference temperature, the sensor is made to have a greater resistance at such reference temperature.

Where both a surface probe and an immersion probe are employed with the same meter, the immersion probe has a temperature sensitive resistance at the reference temperature that is less than the temperature sensitive resistance of the surface probe at the reference temperature. The probes may have small fixed resistances added so that all probes read substantially the same at a reference temperature, which is usually ice point.

BRIEF DESCRIPTION OF THE DRAWINGS

FIGS. 1 and 2 illustrate exemplary surface and immersion probe configurations;

FIG. 3 is a section showing, on a greatly enlarged scale, construction of a typical surface probe;

FIG. 4 is a schematic illustration of the electrical circuit of a probe and meter;

DETAILED DESCRIPTION

Figure 5:
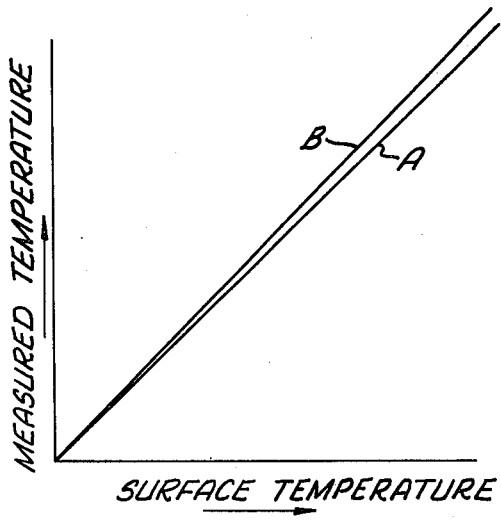
FIG. 5 graphicaly depicts probe sensor performance.

Illustrated in FIG. 1 is typical configuration of a surface probe that is adapted to be plugged into a meter (not shown in FIG. 1) to provide measurements of a surface of an object. A probe comprises a probe tip 10 of a generally conical configuration having a base 12 in the form of a small thin flat disc connected by means of a conical housing 14 and an angulated neck portion 16 to a probe shank 18. The probe shank is connected to an elongated cylindrical handle portion 20 which is in turn connected via a cable 22 to a three-wire phone jack 24 that is adapted to be plugged into a meter.

Details of a typical configuration of probe body 10 are shown in FIG. 3 which illustrates the probe body base 12 fixedly connected to an upstanding conical housing 14 which in turn is fixed to an angulated neck portion 16. Secured to the inside of the circular base plate 12 is a coil of fine platinum wire 26 that is secured by a high temperature adhesive such as an epoxy 28 to the inner surface of plate 12. Preferably, the base plate 12 is also made of platinum to minimize temperature induced dimensional differences that may cause strains in the platinum wire, thus affecting its temperature resistance characteristics. The two ends of the coil 26 are connected to the probe output terminals on the jack 24 by means of copper leads 30, 32 which extend from the coil through the conical housing 14 and through the probe shank and handle.

Although a wire coil sensor is shown, principles of this invention apply to other types of sensors such as the platinum film sensor made by depositing a film of platinum on a suitable substrate, as shown, for example, in U.S. Pat. Nos. 4,129,848, 4,050,052 and 4,103,275. The platinum of the sensor of whatever type may be as defined by the International Practical Temperature Standards adopted in 1968 (IPTS-1968) or by German specifications (DIN43760) for nominal values. Platinum is the interpolating standard of the U. S. National Bureau of Standards. The invention relates to measurements made to standards by probes of any configuration.

The immersion probe body has a different external configuration (as shown in FIG. 2) since it need merely be made in the form of a cylinder 38 having the platinum coil axially positioned at its free end or tip 40. The immersion probe is employed simply by immersing the probe body including a significant portion of its shank, into the fluid medium (or penetrating a semisolid medium) of which temperature is to be measured. The fluid or medium surrounds the probe body for a distance from the immersion tip 40 well beyond the extent of the platinum sensor itself, whereby the latter will substantially obtain the precise temperature of the surrounding medium.

With the surface probe, on the other hand, the flat outer surface of the probe body plate 12 is placed upon and in direct contact with the surface of which temperature is to be measured. Heat is transferred from the surface to be measured to the plate or base 12 and thence through the plate to the platinum coil, or to the platinum film, in the case of a film sensor. Heat is also transferred from the plate to the conical housing 14 and thence to the probe connector portion 16 and shank 18. Heat is also transferred from the probe body and particularly from the conical housing 14 to the ambient atmosphere. Accordingly, there will exist a temperature gradient across the plate 12 that causes sensing resistor 26 to be at a temperature below that of the surface which is in contact with the probe body base plate 12. This presumes measurement made of a surface above room temperature. Where measurement is made of a surface temperature below room temperature, the temperature differential between the probe body base plate and the sensor is of opposite sense, the sensor being at a slightly higher temperature than the base plate.

With either the surface probe or the immersion probe, the platinum resistive sensor indicated in FIG. 4 at 42, is connected to the three-terminal jack 24 which provides probe output terminals 46, 47 and 48. The jack is connected to the input receptacle of a conventional meter 50 of any suitable configuration. Thus, a meter of the type shown in U.S. Pat. No. 4,050,309 of Junkert et al for Method and Apparatus for Measuring Temperature, or other equivalent meters using analog or digital techniques, may be employed. For example, there may be employed a temperature measuring instrument having a measurement system based upon a small computer or microprocessor, as described in U.S. Pat. No. 4,122,719 of Carlson et al for System for Accurate Measurement of Temperature.

Briefly, the meter includes a current source 52 that energizes the sensing resistor 42 and a resistance measuring device, schematically indicated by a voltage measuring circuit 54, that measures the voltage drop across the resistor 42. Thus, the sensing resistor is energized via probe terminals 46, 48 and its resistance, as measured by the voltage across terminals 47 and 48, provides a desired indication of temperature. As well known, the meter is calibrated according to the temperature resistance curve of the platinum sensor according to IPTS-68 (International Practical Temperature Standards revised and adopted in 1968 by international accord). For any given measured resistance the meter provides an output display (preferably visual) of the temperature represented by such resistance.

Operation of a surface probe is shown in FIG. 5 which is a graph of actual surface temperature vs. sensor measured temperature. Because of the losses caused by surface probe configurations, as described above, the actual sensor temperature, curve A of FIG. 5, has a smaller slope than the desired sensor temperature, curve B of FIG. 5. Desirably, sensor temperature is precisely equal to the surface temperature. However, the sensor exhibits a temperature that varies by a fixed percentage (within a reasonable tolerance of ±0.3° C.) throughout its range of temperatures, from the temperature of the surface being measured.

According to a feature of the present invention, the surface probe itself is modified so as to provide automatic compensation for the losses that are unique to surface probes in general. The modification is the increase of the nominal or reference temperature resistance of the platinum resistive sensor to a value greater than that for which the meter is calibrated.

For example, with a meter calibrated for a 100 ohm platinum resistor, the immersion probe, which has substantially no heat loss from its body, will employ a platinum resistor of precisely 100 ohms at the reference temperature. (Reference temperature is generally 0° C. or ice point.) The surface probe, on the other hand, having a heat loss from the probe body which may be within the range of one-half to ten percent, will have its sensor resistance made one-half to ten percent higher. Thus, for the two probes to be used with the one meter calibrated for a 100 ohm platinum resistor, the immersion probe has a 100 ohm platinum sensing resistor and the surface probe has a 105 ohm platinum sensing resistor (for a surface probe with a five percent loss). This increase in the nominal resistance of the platinum surface probe sensor effectively adds to the sensor resistance, as measured by the meter, a compensation factor that is proportional to temperature. The heat loss of the surface probe is also proportional to temperature. Being directly related to the difference between the room temperature and the temperature of the surface being measured, the loss results in a lower resistance measurement and, accordingly, a lower temperature measurement made with the surface probe. By adding to the resistance of the surface probe sensor a factor that increases with temperature, the temperature reading made with this increased resistance surface probe is increased by an amount that tends to compensate for the temperature reading errors due to heat loss from the probe body.

The resistance $R_p$ of a platinum resistor is $$R_p = R_o + R_o \alpha T \quad \text{Eq.(1)}$$

where $R_o$ is the sensor resistance at the commonly used reference temperature 0° C., $\alpha$ is the temperature coefficient of resistance of the platinum resistor (generally 0.00385 for platinum of a quality normally used in resistance measurement) and T is the temperature of the resistor in degrees centrigrade relative to reference temperature. The equation also has higher order terms, (such as $R_o b T^2$ where b is a negative constant) including those varying with the square and higher orders of temperature making the actual temperature resistance curve nonlinear. However, such higher order nonlinear terms need not be specifically considered in this discussion. The meter described in Junkert et al U.S. Pat. No. 4,050,309, describes how higher order terms may be handled. Generally, the compensation effects of the increased sensor resistance are substantially the same for the non-linear terms as for the linear term. For example, for the second order term $R_o b T^2$, the error in temperature measurement due to heat loss from the surface probe body is a function of the square of temperature and the compensating factor added by the increased sensor resistance is also a function of the square of temperature.

The heat loss compensation afforded to a surface probe having a sensor resistor of a value greater than the resistor to which the meter is calibrated will be described in connection with FIGS. 6 and 7 in which the higher order terms of the platinum temperature resistance curves are omitted merely to facilitate discussion.

Figure 6:
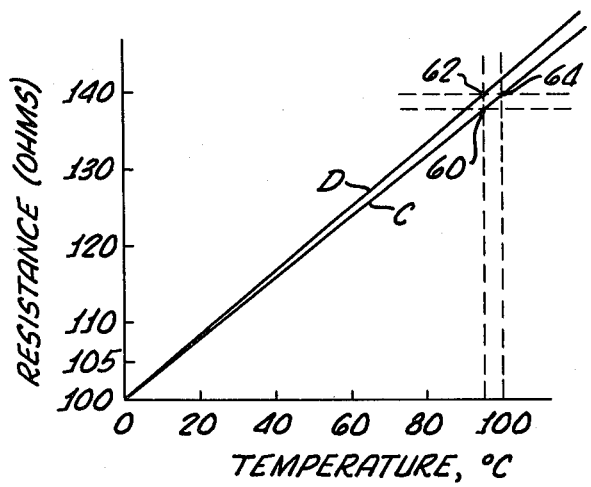
FIGs. 6 and 7 are simplified graphs of temperature vs. resistance characteristics useful in describing principles of the present invention.

As shown in FIG. 6, the straight line curve C graphically represents the temperature variation of a standard platinum resistance having a temperature coefficient of resistance of 0.00385 ohms per ohm per degree centigrade (ignoring the higher order terms such as $R_o b T^2$). A conventional meter calibrated for use with such a resistor will read 0° C. when the sensor resistor is 100 ohms and 100° C. when the sensor resistance is 138.5 ohms. A standard 100 ohm platinum sensing resistor has a 100 ohms resistance at 0° C. With the sensor mounted in a manually manipulatable surface probe such as the hand-held probe of FIG. 1, for example, the platinum resistor, which itself cannot be in direct contact with a surface to be measured, can only reach a temperature of a portion of the probe body that is in contact with the sensor. As previously described the probe body conducts heat from the surface to be measured, conducts heat to the sensor resistor, conducts heat to the probe shank or other support structure for the probe tip, and may also radiate heat. There is always a difference in temperature between the sensing resistor and the surface to be measured. Assuming, for the purposes of this discussion as shown in FIG. 5, that there is a 5% loss (5° at 100°), with the probe in contact with a surface having a temperature of 100°, the temperature of the sensor is 95° and its resistance is 136.6 ohms. Employing a standard meter calibrated to the standard curve C, the meter reading at point 60 will be 95°, whereas if the sensing resistor was truly at 100° its resistance would be 138.5 ohms and the meter would read 100°.

According to different features of the invention, probe resistance is modified in two aspects for the surface (lossy) probe and in one aspect for the immersion (non-lossy) probe. The first aspect, applied only to the surface probe, compensates for the heat loss of the surface probe by increasing the heat variable resistance. A second aspect, applied similarly to both lossy and non-lossy probes adds fixed, non-varying resistance to enable the modified surface probe to be used interchangeably with the same meter as the immersion probe, without meter adjustment or recalibration. The following discussion will first cover only the first aspect of modification of the surface probe.

To compensate for the surface probe losses a factor is added to the probe resistance in the form of a quantity $\Delta R = K R_o$ where $\Delta R$ is the change in resistance of the platinum sensor and K is a constant substantially equal to the loss for a specific surface probe configuration, such as the 5% loss referred to above. Theoretically, adding this factor $\Delta R$ to the surface probe resistance yields the curve D of FIG. 6. The factor $\Delta R$ is substantially proportional to either temperature or resistance of the probe. With proper choice of the constant K the surface probe resistance at a sensor temperature of 95° is 138.5 ohms, which may be point 62 on curve D (considering a 5° loss with a probe in contact with a 100° surface). Using this modified resistance to read a temperature value from the original, or standard, meter calibration curve C at point 64 will give a reading of 100° for a resistance of this modified surface probe of 138.5 ohms. Similar increased probe resistances will be measured at other temperatures, above and below 100°.

In a real surface probe the resistance factor $\Delta R$ is added merely by increasing the nominal resistance (resistance at 0° C.) of the sensor, which both increases nominal resistance and adds the $\Delta R$ needed to compensate for the probe loss of temperature.

Increasing the resistance of the platinum sensor by the amount KR, the measured resistance is defined by $$R_p = (R_o + KR_o) + (R_o + KR_o)\alpha T \qquad \text{Eq. (2)}$$

(again omitting second and higher order factors that introduce nonlinearity of resistance variation with temperature in platinum). The surface probe resistance has been modified by the addition of the factor KR. Equation (2) above may be rewritten as $$R_p = R_o + KR_o + R_o\alpha T + KR_o\alpha T \qquad \text{Eq.(3)}$$

Accordingly, it will be seen that the factor $\Delta R$ can be introduced simply by adding the quantity $KR_o$ to the nominal probe resistance $R_o$ to which the meter is calibrated.

Figure 7:
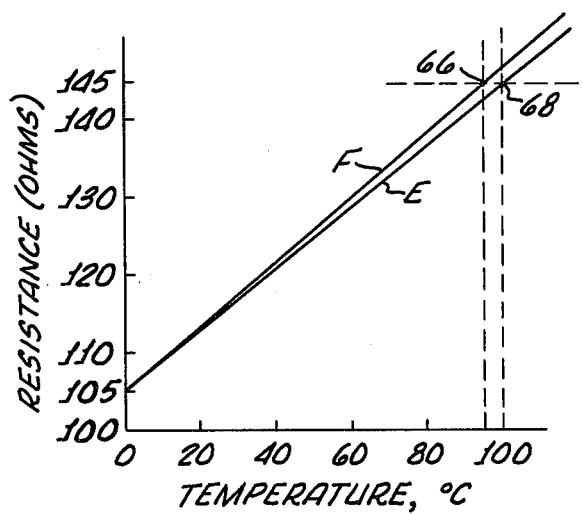

FIG. 7 illustrates use of a modified calibration curve for the surface sensor modified as described above. Curve E represents the theoretical resistance temperature calibration curve in the form of the curve of a platinum resistor (omitting nonlinear quantities) to which has been added a fixed resistance, one that does not vary with temperature. For example, adding a 5 ohm fixed resistance, a resistance that does not vary with temperature, to the 100 ohm (nominal resistance at 0° reference temperature) platinum resistance will provide the calibration curve E. This curve is used to read temperature with the lossy surface probe of increased nominal resistance. This same curve is also used, as more particularly explained below, to read temperature with a probe such as an immersion probe that is not a subject to the heat loss of the surface probe.

Curve E is defined by $$R_p = R_o + K_I + R_o\alpha T \qquad \text{Eq.(4)}$$

where $K_I$ is a fixed 5 ohm resistor and $R_o$ is the 100 ohm platinum resistor. The calibration curve E does not include the compensation term $KR_o\alpha T$. Preferably, $K_I$ is equal to $KR_o$.

If 5 ohms is added to the platinum resistance, making the platinum sensor 105 ohms at 0°, the sensor curve now is as shown at F. The curve is still 105 ohms at 0° C. (like curve E) but has a steeper slope. This 105 ohm sensor, when at 95° (in a lossy surface probe on a 100° surface) has a resistance of 143.4 ohms as indicated at point 66 of curve F. Using a meter calibrated to the curve E to read a temperature from the resistance of a platinum sensor having the curve F provides temperature readings that are higher than those represented by the actual resistance of the probe sensor by a factor substantially porportional to temperature, and substantially proportional to probe resistance. A meter calibrated to the curve E (for a 100 ohm platinum resistor) reads 100° for a resistance measurement of 143.5 ohms, as indicated at point 68 of curve F. Thus the added factor $\Delta R$ compensates for a major portion of the errors due to the surface probe heat loss.

Because the error of the surface probe is related to the temperature difference between the surface being measured and ambient atmosphere, the error will be negative only where ambient temperature is below measured temperature. This error is zero when ambient and measured temperatures are equal, and is positive when ambient temperature is less than measured temperature. This change in sign of the surface probe error is not shown in the curves of FIG. 5 merely for convenience of exposition. For measurements of surfaces at temperatures below 0° C. (reference temperature) the correction factor $KR_o\alpha T$ of equation (3) changes sign as T goes negative so that the described compensation applies for measurement of temperatures below reference temperature. For the temperature range between 0° C. and room temperature (about 25° C.) the described surface probe loss compensation will not be effective. However effects of the increased sensor resistance are small enough to be disregarded for measurements between ambient and reference temperatures. Furthermore, the great majority of use of probes of the type referred to herein is for measurement of temperatures that are significantly above room temperature.

The probe modification that allows both lossy (surface) and non-lossy (immersion) probes to be used interchangeably with the same meter will now be described.

As previously mentioned, the temperature of the surface probe resistor will be below that of the surface being measured, when measuring surfaces at temperatures above room temperature, whereas the temperature of the immersion probe resistor will be substantially equal to the temperature of the medium being measured. Even though one probe body experiences heat losses that the other does not, both are desired to be used with the same meter, simply unplugging one and plugging the other into the meter when different types of measurements are to be made. Desirably, this interchangeability of the probes must be achievable without modification of the meter and without any additional steps such as manipulation of switches or changing calibration of the meter. If it were required to manipulate the meter in any way as, for example, to change a calibration thereof, in changing from one probe to the other it is possible that, in some cases, the required meter manipulation would be inadvertently omitted, resulting in incorrect measurement.

According to a feature of this invention both the immersion probe and the surface probe are made to provide at the probe output terminals, the same resistance, as seen by the meter, at 0° centigrade. As an example, both immersion and surface probes are made to provide a resistance at probe output terminals 47, 48 (FIG. 4) of 105° C. In the surface probe, this is done by making the platinum (temperature variable) sensing resistor with a nominal value of resistance at 0° centigrade of 104.5 ohms and connecting a small fixed (non-temperature varying) trimming resistor 60 (FIG. 4) of 0.5 ohms within the probe handle in series with the temperature varying platinum resistor 42, making a total resistance across the probe output terminals of 105 ohms at 0° centigrade. Resistor 60 is mounted at any convenient point within the probe between the probe tip and the probe terminals. It is preferably not positioned where it will be affected by heat from a body of which temperature is being measured. Thus, it may be mounted within handle 20 or at the jack 24.

In the immersion probe the platinum resistor 42 is 100 ohms at 0° centigrade. A fixed non-temperature varying resistor is also connected in series with the platinum sensor within the probe. However, for the immersion probe the fixed resistor is 5 ohms, again making the total resistance across probe output terminals equal to 105 ohms at 0° C. Thus both lossy and non-lossy probes present the same (mutually equal) resistances at probe output terminals, at the reference temperature.

The fixed resistance used in each case may vary according to the actual probe resistance, as measured on manufacture of the probe. The platinum sensing resistor in each probe is connected to the probe output terminals by copper wires positioned within the probe body. These copper wires have a small, but nevertheless finite resistance which may vary from one probe to the next, even though such probes are of presumably precisely identical configuration and construction. In manufacture of the probes, platinum resistor values are precisely controlled, the immersion probe resistor to 100 ohms, and the surface probe resistor to a larger value depending upon a previously determined heat loss from a probe body of a given configuration. Such heat losses in any one probe configuration may be established beforehand, and may vary by very small amounts from one probe body to the next, even though of a presumably identical construction. These variations can be controlled within small tolerances. Therefore, a given increase in platinum resistance value is most conveniently made the same for all probes of like configurations to compensate for heat loss of all such probes.

These techniques are especially useful in platinum film sensor probes. The resistance of the probe internal leads is also measured to enable the fixed resistor to be chosen to provide a precise 105 ohms (at 0°) at the probe output terminals. For example, in the surface probe, if the probe internal leads are found to have a total resistance of 0.2 ohms, and the platinum resistance is 104.5 ohms, the fixed resistance added in series with the platinum resistance will be chosen to be 0.3 ohms, making a total of 105. Other values of the platinum resistance 42 of the surface probe sensor may be employed, depending upon measured actual heat loss of a typical probe body configuration. Similarly, other values of fixed resistance 60 may be used to produce a total output resistance other than 105 ohms, provided that the total output resistance of both types of probes is the same.

With both probes providing a nominal 105 ohm resistance at reference temperature, each may be used interchangeably with the other when connected to the same meter calibrated to the curve E of FIG. 7. The immersion probe, having no added factor ΔR, will provide a temperature resistance curve that precisely matches the temperature resistance curve E to which the meter is calibrated and the readings of the fluid temperature are precise. For the surface probe, on the other hand, the larger platinum resistance provides a resistance reading that is high, following the curve F, and this will be interpreted by the meter according to the calibration curve E, whereby surface probe readings are increased by an amount that varies with temperature. This compensates for the surface probe heat losses.

There have been described methods and apparatus for obtaining improved accuracy and interchangeability of heat sensing probes that are simple and inexpensive to implement and relatively free of possibility of misuse.

The foregoing detailed description is to be clearly understood as given by way of illustration and example only, the spirit and scope of this invention being limited solely by the appended claims.

What is claimed is:

1. A resistance heat measuring system comprising
    a plurality of independent, individually separate and mutually unconnected probes including at least an immersion probe and a surface probe, each said probe having a probe body and a resistive sensor mounted therein, said immersion probe sensor having a nominal resistance at a reference temperature and a nontemperature varying resistor connected in series therewith,
    a first detachable electrical connector attached to said immersion probe body and electrically connected to the immersion probe sensor,
    a second detachable electrical connector attached to said surface probe body and electrically connected to the surface probe sensor,
    a meter for indicating temperature in accordance with measured resistance of a probe sensor, said meter being calibrated to the resistance temperature curve of a resistive sensor having said nominal resistance at said reference temperature,
    means including said connectors for alternatively and detachably connecting one or the other of said probes to said meter,
    said surface probe sensor having a resistance at said reference temperature that is substantially the same as the sum of the resistance of said immersion probe sensor, and said nontemperature varying resistor at said reference temperature whereby the resistance of said surface probe sensor changes at a greater rate with equal temperature changes in said sensors than does the resistance of said immersion probe sensor to thereby decrease errors due to loss of heat from said surface probe body to ambient atmosphere when said surface probe is connected to the meter and said surface probe body is in contact with a surface of which temperature is to be measured, and whereby each said probe may be interchangeably and individually connected to said meter for temperature measurement without changing calibration of the meter.

2. The system of claim 1 wherein each probe connector has output terminals at which sensor resistance is measured, each probe having an added fixed resistance of a value that causes measured resistance at said terminals to be the same for both probes at a reference temperature.

3. The system of claim 1 wherein said immersion probe body is constructed and arranged to be immersed in a medium of which temperature is to be measured with such medium surrounding that portion of the probe body in which the immersion probe sensor is mounted, and wherein said surface probe body includes a flat plate in heat transferring contact with said surface probe sensor, said plate being constructed and arranged to directly contact a surface or which temperature is to be measured, said surface probe body including a housing portion that contacts ambient atmosphere, whereby said surface probe housing will lose heat to ambient atmosphere but said immersion probe body will obtain the temperature of the medium of which temperature is to be measured.

4. In combination with a temperature measuring meter of the type that indicates measured temperature as a function of measured resistance of a probe sensor and being adapted to have probes of different configurations connected thereto, first and second separate and mutually independent probes having probe bodies of mutually different configurations for separately and independently of each other contacting objects of which temperature is to be measured, each probe body having a resistive sensor mounted thereto and each body having a detachable electrical connector providing output terminals connected with respective sensors, means including said output terminals for individually and alternatively connecting each said probe to said meter so that the meter can alternatively measure the resistance of one or the other of said probe sensors with the same meter calibration, said second probe body having a heat loss to its ambient environment when measuring temperature, so that the second probe sensor is at a temperature below that of the object being measured, both said probe sensors having the same temperature coefficient of resistance, the sensor of said first probe having a nominal resistance at a reference temperature, and the sensor of said second probe having a resistance greater than said nominal resistance at said reference temperature, and a nontemperature varying resistor connected in series with said first probe sensor and having a value substantially equal to the difference between the resistances of said probe sensors at said reference temperature, said meter being calibrated to a resistance less than the resistance of said second probe, whereby the meter, when connected to said second probe, indicates a measured temperature greater than the temperature of the second probe sensor.

5. The apparatus of claim 4 wherein first and second trimming resistors are respectively mounted in said first and second probe bodies and connected to said probe sensors to present mutually equal resistances at said probe output terminals at said reference temperature.

6. A heat measuring system comprising a first probe including a first housing, a first sensor resistor having a temperature coefficient of resistance and mounted to said housing, a non-temperature varying resistor connected in series with said first sensor resistor, and a first connector secured to said housing and electrically connected to said resistors, a second probe including a second housing, a second sensor resistor having the same temperature coefficient but a greater resistance at a give temperature than said first sensor resistor and mounted to said second housing, and a second connector secured to said second housing and electrically connected to said second resistor, said non-temperature varying resistor having a value substantially equal to the difference between the resistances of said sensor resistors at said given temperature, said second housing having a heat loss to ambient atmosphere when said second probe housing is in contact with a surface of which temperature is to be measured, whereby said second resistor, when used to measure temperature of a surface, has a temperature lower than that of the surface to be measured, thereby tending to introduce an error in the temperature measurement, said first housing having a heat loss to a surrounding medium, when said first probe is used to measure temperature, that is less than said first-mentioned heat loss, a meter calibrated to the resistance temperature curve of said first sensor resistor, and means including said connectors for separately, independently and alternatively connecting each said probe to said meter without recalibration of the meter, whereby either one of said probes may be connected to the meter for making a temperature measurement independently of the other with recalibration of the meter.

7. The measuring system of claim 6 wherein said first probe includes a handle secured to said first housing and a cable connected between said handle and said first connector, and wherein said second probe includes a second handle secured to said second housing and a second cable connected between said handle and said second connector, whereby each said probe may each be manipulated and positioned for heat measurement independently of the other.

8. The system of claim 6 wherein said first probe is an immersion probe, said first housing comprising an elongated cylinder having said first resistor mounted therein, said second probe being a surface probe, said second housing comprising a probe base plate and a conical housing portion connected thereto, said second sensor resistor being secured to said base plate.

* * * * *

UNITED STATES PATENT AND TRADEMARK OFFICE
CERTIFICATE OF CORRECTION

PATENT NO. : 4,436,438
DATED : Mar. 13, 1984
INVENTOR(S) : Henry P. Voznick

It is certified that error appears in the above-identified patent and that said Letters Patent are hereby corrected as shown below:

Claim 3 (column 10, line 62), delete "or", and substitute therefor ---of---.

Claim 6 (column 12, line 34), delete "with", and substitute therefor ---without---.

Signed and Sealed this

Thirty-first Day of July 1984

[SEAL]

Attest:

GERALD J. MOSSINGHOFF

Attesting Officer

Commissioner of Patents and Trademarks